US012244616B2

(12) United States Patent
Sugarbaker et al.

(10) Patent No.: US 12,244,616 B2
(45) Date of Patent: *Mar. 4, 2025

(54) PRIORITIZING ASSETS USING SECURITY METRICS

(71) Applicant: Cisco Technology, Inc., San Jose, CA (US)

(72) Inventors: Travis Nathan Sugarbaker, Seattle, WA (US); Srivatsa Shripathi Modambu, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,661

(22) Filed: Nov. 14, 2022

(65) Prior Publication Data
US 2023/0072859 A1  Mar. 9, 2023

Related U.S. Application Data

(63) Continuation of application No. 17/026,093, filed on Sep. 18, 2020, now Pat. No. 11,503,048.

(30) Foreign Application Priority Data

Jul. 30, 2020  (IN) .............................. 202041032709

(51) Int. Cl.
H04L 9/40 (2022.01)

(52) U.S. Cl.
CPC ...... H04L 63/1416 (2013.01); H04L 63/0236 (2013.01); H04L 63/105 (2013.01);
(Continued)

(58) Field of Classification Search
CPC . H04L 63/20; H04L 63/1433; H04L 63/1425; H04L 63/105; H04L 63/1416; H04L 63/0236
(Continued)

(56) References Cited

U.S. PATENT DOCUMENTS 8,245,296 B2 *  8/2012  Archer ................. G06F 21/562
                                                      713/188
10,320,830 B2  6/2019  Ahuja et al.
(Continued)

FOREIGN PATENT DOCUMENTS

AU  2019232785 A1  6/2020
CA  3055978 A1  5/2020
(Continued)

OTHER PUBLICATIONS

Office Action for U.S. Appl. No. 17/026,093, mailed on Mar. 16, 2022, Sugarbaker, "Prioritizing Assets Using Security Metrics", 16 pages.
(Continued)

Primary Examiner — Teshome Hailu
(74) Attorney, Agent, or Firm — Lee & Hayes, P.C.

(57) ABSTRACT

This disclosure describes techniques for identifying the criticality of an asset in a network. In an example method, a first security metric of a first asset in a network, as well as network data that identifies data flows associated with a second asset in the network are identified. The second asset is a nearest neighbor of the first asset in the network. The method includes determining, based on the network data, a number of hosts in the network that exchanged data traffic with the second asset during a time period and generating a second security metric of the second asset based on the first security metric and the number of hosts. A security policy of the second asset is adjusted based on the security metric.

20 Claims, 5 Drawing Sheets

(52) U.S. Cl.
CPC ...... *H04L 63/1425* (2013.01); *H04L 63/1433* (2013.01); *H04L 63/20* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 10,896,268 | B2* | 1/2021 | Dayan | H04W 12/50 |
| 2012/0278861 | A1* | 11/2012 | Lu | G06F 21/45 |
| | | | | 726/4 |
| 2013/0031634 | A1 | 1/2013 | McClure et al. | |
| 2014/0173739 | A1* | 6/2014 | Ahuja | G06F 21/577 |
| | | | | 726/25 |
| 2014/0215550 | A1* | 7/2014 | Adams | G06F 21/32 |
| | | | | 726/1 |
| 2014/0289827 | A1* | 9/2014 | Tang | H04L 63/107 |
| | | | | 726/6 |
| 2018/0097828 | A1* | 4/2018 | Coskun | H04W 12/08 |
| 2018/0131716 | A1* | 5/2018 | Chantz | H04L 63/1425 |
| 2018/0309778 | A1 | 10/2018 | Sugarbaker | |
| 2018/0351988 | A1 | 12/2018 | Ahuja et al. | |
| 2019/0005276 | A1* | 1/2019 | Dayan | G06F 21/87 |
| 2019/0147162 | A1* | 5/2019 | Mejbah | G06N 3/088 |
| | | | | 726/23 |
| 2019/0215688 | A1* | 7/2019 | Zavesky | H04L 67/56 |
| 2019/0238584 | A1 | 8/2019 | Somasundaram et al. | |
| 2019/0253450 | A1 | 8/2019 | Ahuja et al. | |
| 2020/0092319 | A1 | 3/2020 | Spisak et al. | |
| 2020/0162497 | A1 | 5/2020 | Iyer et al. | |
| 2020/0162498 | A1 | 5/2020 | Ababtain et al. | |
| 2020/0204576 | A1* | 6/2020 | Davis | H04L 63/20 |
| 2021/0279565 | A1* | 9/2021 | Akella | H04K 1/00 |
| 2022/0038471 | A1 | 2/2022 | Sugarbaker et al. | |

FOREIGN PATENT DOCUMENTS

| | | |
|---|---|---|
| CN | 104798079 A | 7/2015 |
| EP | 2936374 A1 | 10/2015 |
| EP | 3654220 A1 | 5/2020 |
| KR | 20150070331 A | 6/2015 |
| WO | WO2014100103 A1 | 6/2014 |
| WO | WO2020106479 A1 | 5/2020 |

OTHER PUBLICATIONS

The International Search Report and Written Opinion for PCT Application No. PCT/US21/43585, mailed Nov. 4, 2021, 16 pages.

* cited by examiner

| Asset Address 302 | Asset Port 304 | Remote Host Address 308 | Binary Address 310 | Shortened Address 312 |
|---|---|---|---|---|
| 9.9.9.9 | 443 | 1.1.1.1 | 00000001000000010000000100000001 | 00000001000000010000000100000001 |
| 9.9.9.9 | 443 | 1.1.1.2 | 00000001000000010000000100000010 | 00000001000000010000000100000010 |
| 9.9.9.9 | 80 | 2.2.2.1 | 00000010000000100000001000000001 | |
| 9.9.9.9 | 80 | 2.2.2.2 | 00000010000000100000001000000010 | |

PRIORITIZING ASSETS USING SECURITY METRICS

CROSS-REFERENCE TO RELATED APPLICATIONS

This patent application is a continuation of U.S. patent application Ser. No. 17/026,093, filed Sep. 18, 2020 and titled "PRIORITIZING ASSETS USING SECURITY METRICS," which claims the benefit of Indian Provisional Application No. 202041032709, filed on Jul. 30, 2020 and titled "PRIORITIZING ASSETS USING SECURITY METRICS," the contents of each of which are incorporated by reference herein in their entirety.

TECHNICAL FIELD

The present disclosure relates generally to identifying the security metrics of assets, such as hosts, applications, or ports, as well as prioritizing the assets according to their respective security metrics. For instance, security management of the assets can be prioritized according to security metrics.

BACKGROUND

In an example enterprise, a security analyst may have a limited amount of time and resources for adjusting security postures of assets (e.g., hosts, ports, and applications) within the enterprise. Thus, the analyst may prioritize assets within the enterprise and focus their security management efforts on higher-priority assets. In various cases, the analyst may prioritize assets based on based on tacit knowledge of critical subnets and applications within the enterprise. For instance, the analyst may refer to a configuration management database (CMDB) to assess which assets should be prioritized within the enterprise.

However, prioritizing assets based on tacit knowledge presents a number of problems. For instance, a single security analyst may be unable to prioritize assets consistently throughout the enterprise. In addition, if more than one security analyst is managing a shared group of assets, it may be difficult for the security analysts to prioritize assets consistently. Furthermore, a security analyst may be unable to both manually and efficiently prioritize assets within the enterprise, particularly when the security analyst is responsible for managing numerous (e.g., thousands) of assets. Even when a security analyst is able to manually assess the priority of an asset within the enterprise, the security analyst may be unable to adjust the priority of the asset based on real-time changes in network traffic. Manually assessing the importance of an asset to a network is often complex, error-prone, and time-consuming.

Further, as enterprises shift towards development and operations (DevOps) oriented deployment and management of container-hosted and cloud-hosted applications, developers may spin up and/or shut down applications faster than a CMDB can be kept up-to-date. Manually or automatically assessing the relying on the CMDB for the purpose of assessing the priority of an asset can prevent the security analyst from reliably determining the importance of a given asset to employees or customers of the enterprise.

In some examples, a security analyst may rely on vulnerabilities of assets within the enterprise in order to prioritize the assets. The vulnerability of an asset can be evaluated based on vulnerability metadata, such as the Common Vulnerability Scoring System (CVSS). However, evaluating the vulnerability of an asset is also manual, expensive, time-consuming, and error-prone. Further, as the number of application vulnerabilities increases into the millions in a typical enterprise, the scale of multidimensional analysis required becomes a problem that cannot feasibly be solved manually by the security analyst. While the security analyst could use complex machine-learning-based analyses to assess the vulnerabilities of various assets within the enterprise, machine-learning based techniques are often computationally expensive and infeasible for real-time analysis as assets continue to transmit and receive data traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an example table that utilizes shortened addresses for calculating a security metric of an asset.

DESCRIPTION OF EXAMPLE EMBODIMENTS

Overview

Figure 1:
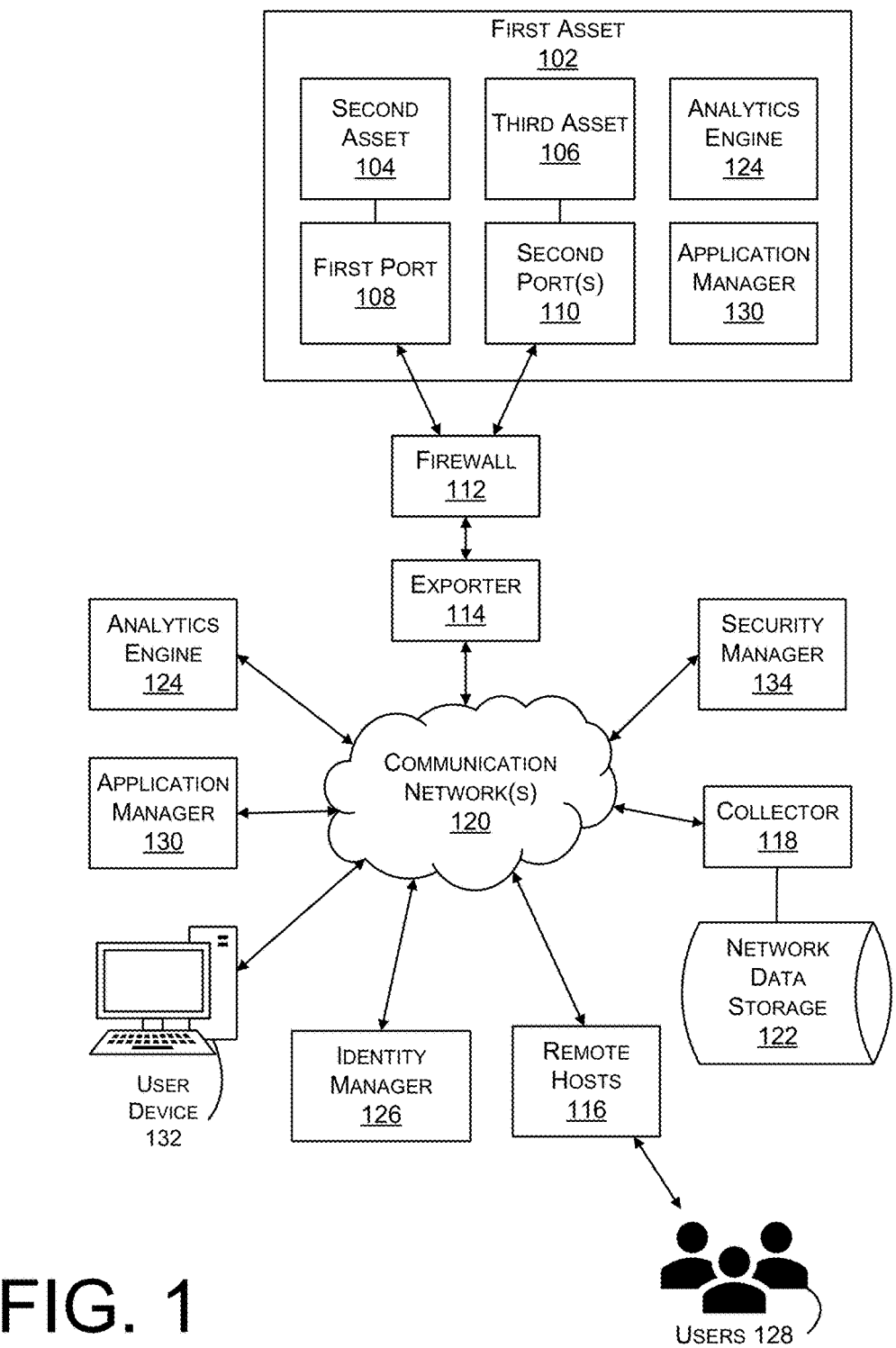
FIG. 1 illustrates an example network environment in accordance with various implementations described herein.

This disclosure describes various techniques for identifying a security metric of an asset. An example method includes identifying a first security metric of a first asset in a network; identifying network data that identifies data flows associated with a second asset in the network, the second asset being a nearest neighbor and/or a proximal neighbor of the first asset in the network; determining, based on the network data, a number of hosts in the network that exchanged data traffic with the second asset during a time period; generating a second security metric of the second asset based on the first security metric and the number of hosts; and adjusting a security policy of the second asset based on the second security metric.

According to some examples, the second security metric is independent of vulnerabilities of the second asset. In some cases, the second asset includes at least one of an application, a port, or a host. In some examples, a length of the time period is greater than or equal to 7 days and less than or equal to 31 days. In some cases, the length of the time period is greater than or equal to 1 day and less than or equal to 31 days.

In some cases, the second security metric indicates at least one of a criticality of the second asset, an exposure of the second asset, a vulnerability exploit probability of the asset, or an application vulnerability risk of the asset.

In some implementations, the method includes identifying a number of users associated with the hosts that exchanged data traffic with the second asset during the time period, wherein generating the second security metric is based on the number of users.

According to some instances, determining the number of hosts includes identifying, based on the network data, addresses of the hosts; generating shortened addresses by extracting a subset of the most significant digits of the addresses, the shortened addresses being shorter than the addresses; and determining the number of hosts based on a number of the shortened addresses.

In some examples, adjusting the security policy includes determining that the second security metric is above a threshold; and based on determining that the second security metric is above the threshold, decreasing a multi-factor authentication (MFA) interval of the asset. In particular examples, wherein adjusting the security policy includes determining that one or more packets directed to the second asset are blocked by a firewall associated with the second asset; determining that the second security metric is above a threshold; and based on determining that the second security metric is above the threshold, outputting an alert reporting the one or more packets blocked by the firewall.

EXAMPLE EMBODIMENTS

This disclosure describes various techniques for efficiently assessing the criticality of an asset in a network and using the criticality to prioritize and/or adjust security policies associated with the asset.

In various implementations described herein, a security metric can be generated for a particular asset, such as a host, an application running on a host, a port of a host, or the like. As used herein, the term "security metric" of an asset can indicate the asset's exposure, criticality, or a combination thereof. The exposure of an asset corresponds to the accessibility of the asset by other entities (e.g., hosts, users, other assets, etc.) within a network. The criticality of an asset indicates the importance of the asset to an organization (e.g., an enterprise) that includes the asset, and can therefore correspond to the loss that the organization would incur if the asset was compromised. In some cases, a security metric indicating the exposure of an asset can be referred to as an "exposure metric," and a security metric indicating The security metric is calculated, for instance, based on network data associated with the asset. The network data can reflect and/or indicate data traffic that has been exchanged with the asset, such as ingress data traffic addressed to the asset, egress traffic transmitted by the asset, or a combination of ingress and egress traffic. In some examples, the network data indicates unique hosts that have accessed (e.g., transmitted data traffic to and/or received data traffic from) the asset over a period of time. For instance, the network data indicates Internet Protocol (IP) addresses of the hosts that have sent data traffic to, or received data traffic from, the asset during the time period. In some cases, the security metric is calculated based on the number of unique addresses of hosts that have sent data traffic to the asset during the time period, the number of unique addresses of hosts that have received data traffic from the asset during the time period, or a combination thereof.

According to some implementations, the security metric can be calculated based on a number of users that have exchanged data traffic with the asset. In some cases, one host may have thousands of users and another host may have ten users, such that the hosts can impact the exposure of an asset to different degrees. In some examples, the number of users associated with individual hosts within a network can be mapped. Based on this mapping, and the number of hosts that have accessed the asset, the number of users that have accessed the asset can be derived. The security metric may be calculated based on the number of users that have accessed the asset. In some cases, the criticality is based on both the number of hosts and the number of users that have accessed the asset.

In some examples, the security metric can be calculated based on the number of locations of the hosts that have exchanged data traffic with the asset. The locations of the hosts can be derived, for instance, using Network Visibility Flow (nvzFlow) from CISCO SYSTEMS, INC. of San Jose, California. In some cases, other protocols or technologies can be used to identify the locations of the hosts.

Calculating the security metric based on the number of hosts and/or number of users accessing the asset can be relatively computationally inexpensive, but the security metric can nevertheless significantly indicate the criticality of the asset to a network. In some cases, the security metric can be calculated independently of content-based analyses such as assessments of the assets' vulnerability to attack. Experiments have shown that the simplified security metric described herein is significantly correlated to manual and/or machine learning-based techniques for assessing security risks, but can be performed at a much lower cost and at a much greater speed than other techniques. To further reduce the computational expenditure of calculating the security metric, addresses (e.g., IP addresses) of the hosts that have exchanged data traffic with a particular asset can be shortened and the number of shortened addresses can be used to estimate the number of unique hosts that have accessed the asset. In some cases, each address can be converted to binary form and a subset of the binary digits may be considered in the calculation of the security metric. The shortened versions of these addresses significantly capture the diversity of remote hosts accessing the asset, and significantly reduces the computational cost of calculating the security metric for the asset. In some cases, location indicators (e.g., as output by nvzFlow) can be similarly shortened, thereby lowering the computational cost of calculating the security metric for the asset based on the number of locations of hosts that have accessed the asset. The shortened versions can indicate the exposure of the asset.

In some implementations, a security metric of one asset is used to calculate the security metric of another, neighboring asset in a network. For example, if a first asset receives ingress data traffic from multiple remote hosts, and transmits egress data traffic to a second asset, the security metric associated with the ingress data traffic received at the first asset also indicates at least a portion of the communal relevance of the second asset to the network at large. Thus, a security metric of one asset can be propagated to other security metrics of other assets in the network.

In some examples, the security metric can be combined with other metrics in order to assess a security risk of the asset. In some cases, the security metric itself can represent the combination of multiple metrics. For instance, a vulnerability exploit probability of the asset can be calculated by combining (e.g., multiplying) a first security metric (e.g., representing the asset's exposure) with a score indicating the asset's exploitation risk (e.g., a maximum CVSS score of the asset). The exploitation risk can be calculated based on a vulnerability risk of the asset, a compliance risk of the asset, a malware risk of the asset, a denial of service (DOS) risk of the asset, or any combination thereof. In some cases, the exposure of the asset may be relatively high but the maximum CVSS may be relatively low, or the exposure of the asset may be relatively low but the maximum CVSS may be relatively high, such that the security of the asset can be deprioritized without exposing an enterprise associated the asset to significant security risks.

In some examples, the security metric can include, or be combined with, another metric that indicates a vulnerability risk of the asset. In general, a risk of a loss event is equal to the product of the probability of the loss event occurring and the total loss of the event, if it occurs. In various implementations described herein, the loss due to a security vulnerability of an asset correspond to a second security metric (e.g., representing the criticality) of the asset. The probability of an event wherein the security vulnerability is exploited is represented by the exploitation risk. The probability of the loss event occurring corresponds to the asset's exploitation risk (e.g., maximum CVSS). In various implementations, the vulnerability risk of the asset can be calculated by combining (e.g., multiplying) the second security metric with the vulnerability exploit probability. In some cases, an asset may have a significant criticality but low exploitation risk, or may have a low criticality but significant exploitation risk, such that the security of the asset can be deprioritized without exposing an enterprise associated the asset to significant security risks.

The asset can be prioritized according to any of the combined metrics described herein. For example, if the security metric (which can represent the criticality, exposure, vulnerability exploit probability, vulnerability risk, or any combination thereof) exceeds a particular threshold, actions can be taken to further protect the asset from security risks.

In some implementations, the security metric of an asset can be used to alter the security posture of the asset. For example, if the security metric is above a certain threshold, multi-factor authentication (MFA) may be activated for the asset. In some cases, an MFA interval can be decreased as the security metric increases. In various examples, a firewall protecting the asset can apply a more stringent security policy as the security metric increases. In some cases, the firewall can selectively output reports of data traffic blocked by the firewall when the security metric of the asset exceeds a threshold. In some cases, the firewall can selectively report blocked data traffic to an administrator if the security metric is sufficiently high. Further, in some examples, the security metric itself can be reported to the administrator, who can potentially prioritize security precautions for the asset over other assets in an enterprise that may be associated with lower security metrics.

Various implementations of the present disclosure provide specific improvements to the field of computer networks. The security metric described herein can be calculated using a simple technique that uses far fewer computing resources than calculations using vulnerability-based metrics. Accordingly, the security metric can be calculated substantially in real time and can be updated based on ongoing data traffic to the asset. Further, the security metric is substantially correlated with more complex analyses that involve vulnerability analyses of the asset. As a result, the security metric described herein can provide significant savings in terms of time and computational cost over existing solutions, without introducing significantly detrimental effects.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example network environment 100 in accordance with various implementations described herein. The environment 100 includes multiple types of assets, including a first asset 102, a second asset 104, and a third asset 106. As used herein, the term "asset," and its equivalents, can refer to hardware, firmware, software, or a combination thereof. For example, an asset can be a host or an application operating on a host. In some cases, an asset can be a port. The first asset 102, the second asset 104, and the third asset 106 may be managed with various security policies and vulnerable to attack from malicious entities that operate within the environment 100.

The first asset 102 is a host. As used herein, the term "host" can refer to any network entity with a particular (e.g., unique) address. As used herein, the term "address" can refer to a label identifying a node within a network. Some examples of addresses include, for example, Internet Protocol (IP) addresses, media access control (MAC) addresses, an autonomous system number (ASN), or the like. As used herein, the terms "node," "network node," and their equivalents, can refer to any entity within a network that can transmit packets to and/or receive packets from at least one other node. A node may be a device, a software instance, a Virtual Machine (VM), a container, a virtual process, or the like. In some examples, a node may include a grouping of devices or virtual resources, such as security groups, subnetworks, and so forth. In some examples, a node can be a client, a server, or a combination thereof. In some cases, the first asset 102 includes hardware. In some examples, the first asset 102 further includes software.

The second asset 104 and the third asset 106 may be applications running on the first asset 102. As used herein, the term "application," and its equivalents, can refer to software that, when executed by hardware (e.g., one or more processors), causes the hardware to perform one or more functions on behalf of a user. An application may perform a particular task for a user. In some cases, an application may operate in a VM on a host. In some examples, either or both of the second asset 104 and the third asset 106 can be a cloud-based application operating on the first asset 102. In some cases, the second asset 104 and the third asset 106 can include software.

The first asset 102 includes various ports that enable the first asset 102, the second asset 104, and the third asset 106 to communicate with other network nodes within the environment 100. A first port 108 is associated with the second asset 104. One or more second ports 110 are associated with the third asset 106. As used herein, the term "port," and its equivalents, can refer to an endpoint of a communication of data (e.g., data packets) between devices. Each port may be assigned a port number, according to various implementations. A port may be associated with an address (e.g., an IP address) of a host and a type of data (e.g., a protocol).

As shown in FIG. 1, the first asset 102, the second asset 104, and the third asset 106 can receive data traffic and send data traffic to other network nodes in the environment 100. Ingress (e.g., inbound) and/or egress (e.g., outbound) data traffic of the assets 102, 104, and 106 is protected by a firewall 112. As used herein, the term "data traffic," and its equivalents, can refer to the transmission of one or more data packets between network nodes within a network. According to some cases, data traffic may be arranged into flows. As used herein, the terms "data flow," "network flow," "flow," and their equivalents, can refer to multiple packets that are transmitted from a source to a destination in a single session. The packets of a flow may have the same source address, the same destination address, the same ingress interface (e.g., a Simple Network Management Protocol (SNMP) ifIndex), the same source port, the same destination port, the same protocol (e.g., IP protocol), or a combination thereof. Packets within a single flow may include the same type of data (e.g., a single IP type of service).

The firewall 112 is configured to inspect the data traffic and apply one or more firewall rules (also referred to as "security rules" or "policy rules") to the data traffic. If a data packet in the data traffic complies with the firewall rule(s), then the firewall 112 allows the data packet or flow to proceed on to its destination. However, if the data packet does not comply with the firewall rule(s), then the firewall 112 blocks the data packet from proceeding to its addressed destination in the network environment 100. The firewall 112 can be, in some cases, implemented as a physical device connected to the first asset 102, the second asset 104, and the third asset 106. In some cases, the firewall 112 can be implemented by software running on multiple devices in a distributed environment. For instance, the firewall 112 can be a cloud-based firewall.

The ingress and egress data traffic of the assets 102, 104, and 106 may pass through an exporter 114. The exporter 114 may intercept the data traffic and generate network data based on the data traffic. The network data can indicate features about the data traffic. For example, the network data can indicate an address of a source of a data packet in the data traffic, an address of a destination of the data packet, a time at which the data packet was transmitted by its source and/or intercepted by the exporter 114, a type of data in the data packet, an identifier of a flow in which the data packet is included, a port from which the data packet is transmitted, a port to which the data packet is addressed, or the like. According to various implementations, the source of egress data traffic is the asset 102, 104, or 106 and the destination(s) of the egress data traffic include one or more of multiple remote hosts 116. Further, the data traffic may be transmitted or received at any one of the first port 108 or the second port(s) 110. In various examples, the source(s) of ingress traffic includes one or more of the remote hosts 116 and the destination of ingress traffic is the asset 102, 104, or 106.

The remote hosts 116 are connected to the assets 102, 104, and 106 via one or more communication networks 120. As used herein, the term "communication network," and its equivalents, can refer to any combination of devices and interfaces over which data can be transmitted. The communication network(s) 120 can include, for example, one or more local area networks (LANs), wireless networks, cell networks, virtual private networks (VPNs), wide area networks (WANs) (e.g., the Internet), or any combination thereof. In some cases, the communication network(s) 120 can include one or more wired networks (including, e.g., at least one optical cable, Ethernet cable, or the like), one or more wireless network (including, e.g., a radio access network (RAN) a WiFi network, or the like), or any combination thereof. Although the communication network(s) 120 are illustrated in FIG. 1 as collectively connecting multiple elements within the network environment 100, in some cases, different networks among the communication network(s) 120 may connect different elements within the network environment 100. For example, a first communication network among the communication network(s) 120 may connect a first host among the remote hosts 116 to the first asset 102, and a second communication network among the communication network(s) 120 may connect a second host among the remote hosts 116 to the first asset 102, and so on.

In some implementations, the exporter 114 utilizes NetFlow in order to generate the network data. For example, the exporter 114 may be implemented on a network switch that receives IP data traffic to and from the assets 102, 104, and 106. The exporter 114 may identify the network data based on the IP data traffic. For example, the exporter 114 may identify one or more distinct flows within the data traffic. When the exporter 114 determines that a particular flow has ceased, the exporter 114 may output a flow record to a collector 118 over one or more communication networks 120. In some cases, the flow record may be output to the collector 118 as a User Datagram Protocol (UDP) datagram. The flow record may include, among other information, a time at which the particular flow began, a number of bytes in the flow, a number of packets in the flow, a duration of the flow, an IP address of the source of the flow, and an IP address of the destination of the flow, layer 3 headers associated with the flow, layer 3 routing information, source and destination port numbers, and the like. In various examples, an asset 102, 104, or 106 is the source or the destination of the flow. In some cases, a single flow record may indicate details about multiple flows associated with any of the assets 102, 104, and 106. The collector 118 may store the flow record in the network data storage 122. According to various implementations, the collector 118 and/or the network data storage 122 can be implemented in hardware and/or software. For example, the collector 118 and/or the network data storage 122 can be distributed over multiple computing devices (e.g., servers). In some cases, the network data storage 122 includes one or more databases.

In various cases, the exporter 114 utilizes nvzFlow, or some equivalent protocol, to generate the network data. For example, the exporter 114 may identify one or more distinct flows within the data traffic that is received by the assets 102, 104, and 106 and/or transmitted by the assets 102, 104, and 106. For each flow wherein an asset-of-interest (e.g., the asset 102, 104, or 106) is an endpoint, the exporter 114 may identify a user, a device, an application, a location, and a destination of another endpoint of the flow. The user, for example, may correspond to a user of a device (e.g., a host) exchanging data with the asset-of-interest. The device may correspond to a type of device (e.g., a laptop, a mobile phone, an operating system of the device, or the like) exchanging data with the asset-of-interest. The application may correspond to an application (e.g., an internet browser) from which the user exchanges the data with the asset-of-interest. The location may correspond to the location (e.g., a latitude, a longitude, an accuracy of the latitude and/or longitude, an altitude, or any combination thereof) of the device as it is exchanging data with the asset-of-interest. The destination may indicate the asset-of-interest. A protocol like nvzFlow can provide these details in a list of floating point values (e.g., 32-bit floating point values). Thus, the location of the host exchanging data with the asset-of-interest can be represented by a 32-bit identifier. Thus, the network data may indicate the user, the type of device, the application, and the location of each device that accesses the asset-of-interest.

In various implementations, an analytics engine 124 determines a security metric for at least one of the assets 102, 104, and 106, or at least one of the first port 108 or the second port(s) 110, based on the network data. According to various examples, the analytics engine 124 can be implemented in software, hardware, or a combination thereof. For example, the analytics engine 124 may utilize a limited amount of processing resources and/or memory resources through which to execute tasks, such as calculations of security metrics. In some cases, the analytics engine 124 may calculate security metrics of numerous (e.g., thousands) of assets, including the assets 102, 104, and 106, within an organization or enterprise.

The security metric corresponds to a communal relevance of the asset with respect to the remote hosts 116 in the network environment 100 and/or to users of remote hosts 116 in the network environment 100. In various cases, the risk of an asset to attack is proportional to both its security metric and its vulnerability to the attack. Although vulnerability metrics, such as CVSS, can be helpful for determining the risk of the asset, independent experiments by the inventors of this disclosure have shown that the security metric, alone, is correlated with the risk of the asset to attack. Furthermore, in some cases, the security metric can be calculated automatically and with significantly fewer computing resources of the analytics engine 124 than vulnerability metrics, which often require manual calculations by a human analyst and/or complex machine learning models. Thus, the security metric can be a vulnerability-agnostic and lightweight estimation of the risk of an asset to attack that can be adjusted, in real time, based on data traffic exchanged by the asset. According to some examples, the security metric of an asset 102, 104, or 106 is agnostic to the vulnerability of the asset 102, 104, or 106. Thus, the analytics engine 124 can calculate a security metric of an asset 102, 104, or 106 without calculating, receiving, or identifying a vulnerability metric of the asset 102, 104, or 106. In some cases, the security metric of an asset 102, 104, or 106 is calculated based on the vulnerability of the asset 102, 104, or 106. The inclusion of vulnerability into the security metric can provide a robust estimation of the exploit probability of the asset 102, 104, or 106, for instance.

In some cases, the analytics engine 124 resides on the first asset 102. In some cases, the analytics engine 124 communicates with other elements of the environment 100 via the communication network(s) 120. The analytics engine 124, in some implementations, requests and/or receives the network data from the collector 118 and/or the network data storage 122. In some examples, the exporter 114 directly transmits the network data to the analytics engine 124 for further processing. In some cases, the first host 102 generates its own network data and provides the network data to the analytics engine 124. In some cases, the exporter 114 or at least one of the assets 102, 104, and 106, itself, directly reports the network data to the analytics engine 124. For example, the analytics engine 124 can receive a stream of network data from the exporter 114 and/or the first asset 102 indicating the data traffic associated with the first asset 102.

According to some implementations, the analytics engine 124 identifies the number of the remote hosts 116 that have exchanged data traffic with an asset 102, 104, or 106, based on the network data and generates the security metric for the asset 102, 104, or 106, based on the number of hosts. For example, the analytics engine 124 may identify the number of unique addresses (e.g., IP addresses) as sources of ingress traffic to the second asset 104, and/or the number of unique addresses as destinations of egress traffic from the second asset 104, and calculate the security metric of the second asset 104 based on the number of unique addresses. In various cases, the security metric for an asset 102, 104, or 106 is proportional to the number of addresses of hosts that have accessed that asset 102, 104, or 106. For instance, the security metric can be calculated according to the following Equation 1:

$$S = \frac{n_{access}}{n_{total}} \qquad \text{Eq. 1}$$

wherein "S" represents the security metric of an asset, "$n_{access}$" represents the number of hosts that have accessed the asset, and "$n_{total}$" represents the number of possible hosts within the network. According to various examples, "$n_{total}$" represents the maximum number of hosts that have accessed any asset in the network (e.g., during a particular time period). In some cases, an additional normalization factor can be multiplied with the security metric. The normalization metric may be calculated based on the number of addresses that have accessed other assets in the network environment 100. The number of possible hosts within a network may, in some cases, be defined as the number of possible addresses that can define hosts within the network. For instance, the number of possible addresses may be $2^{32}$ in the case of IPv4 addresses or $2^{128}$ in the case of IPv6 addresses.

In some cases, the analytics engine 124 generates a simplified security metric that can be calculated with fewer computing resources. In various examples, the analytics engine 124 shortens the addresses of hosts that have accessed the asset 102, 104, or 106 and calculates the security metric based on the shortened address. For instance, each IP address accessing an asset may be converted to binary form. Each of the addresses in binary form may have the same number of digits (e.g., 32 digits in the case of IPv4 and 128 in the case of IPv6). The analytics engine 124 may ignore a subset of the least significant digits (e.g., the rightmost digits) of the binary forms of the addresses when calculating the security metric of the asset. The analytics engine 124 may consider a subset of the most significant digits (e.g., the leftmost digits) of the binary forms of the addresses in calculating the security metric of the asset. The fewer digits considered by the analytics engine 124, the fewer computing resources are utilized by the analytics engine 124 in the process of calculating the security metric. Experiments have found that calculating the security metric based on the 24 most significant digits of the binary forms of the addresses substantially captures the criticality of the asset. However, other numbers of most significant digits can be considered for the calculation of the security metric, such as 6, 12, 32, 64, or the like. In some cases, the analytics engine 124 shortens identifiers of locations of the hosts that have accessed the asset 102, 104, or 106 and calculates the security metric based on the shortened identifiers. For example, a floating point identifier of each host accessing an asset may be converted to binary form, and the analytics engine 124 can ignore the subset of the least significant digits of the binary forms of the identifiers, and may consider a subset of the most significant digits of the binary forms of the identifiers, in calculating the security metric of the asset based on the locations of the hosts. For example, if the identifier of a host location is a 32-bit identifier, then the analytics engine 124 may ignore all but the first 24 bits of the binary form of the identifier.

In some examples, the analytics engine 124 calculates the security metric of an asset 102, 104, or 106 based on the number of users utilizing the remote hosts 116 that have accessed the asset 102, 104, or 106. A single one of the remote hosts 116, for instance, may have multiple users. In some cases, multiple hosts among the remote hosts 116 share the same user. Thus, the number of users accessing the asset 102, 104, or 106 may be different than the number of hosts among the remote hosts 116 that access the asset 102, 104, or 106.

An identity manager 126 may maintain a mapping of users to the remote hosts 116. This mapping may be stored in a database, for example. In some cases, the identity manager 126 uses Platform Exchange Grid (pxGrid), Identity Services Engine (ISE), or Duo from CISCO SYSTEMS, INC. of San Jose, Calif. to identify the number of users 128 associated with each of the remote hosts 116. In particular examples, a platform through which multiple security products of an enterprise can share data and work together (e.g., pxGrid) can be used to obtain the host-user associations. For instance, the platform can support sessions indicating host-user associations throughout the network environment 100, wherein the identity manager 126 can subscribe to those sessions in order to identify the number of users 128 associated with each of the remote hosts 116. The identity manager 126 can obtain host-user associations from one or more radius servers that collect these associations. In some cases, a network access control (NAC) system can obtain and report the host-user associations to the identity manager 126. In various cases, the identity manager 126 is included in software, hardware, or a combination thereof.

In various implementations, the analytics engine 124 can request and/or receive mapping data from the identity manager 126. In some cases, the analytics engine 124 can request mapping data associated with ports and hosts included within the network data. For example, the analytics engine 124 can identify addresses multiple hosts among the remote hosts 116 that have accessed the first asset 102 based on network data of the first asset 102. The analytics engine 124 can identify the number of users 128 of the multiple hosts by indicating the addresses to the identity manager 126. The identity manager 126 may, in turn, provide an indication of the number of users 128 of each of the applicable hosts. Thus, the analytics engine 124 may determine the number of the users 128 that have accessed the first asset 102. In various cases, the analytics engine 124 can use the number of the users 128 that have accessed the first asset 102 to calculate the security metric for the first asset 102. For example, the number of the users 128 may be proportional to the security metric.

According to some implementations, the analytics engine 124 may receive or identify network data associated with the first asset 102 and may identify a security metric of the second asset 104 or the third asset 106 based on the network data of the first asset 102. In various examples, the network data may indicate ports (e.g., Layer 4 ports) at which the data traffic to the first asset 102 were received and/or ports at which the data traffic from the first asset 102 was output. The analytics engine 124 may determine which data traffic is associated with the second asset 104 or the third asset 106 based on the ports indicated in the network data. For example, data traffic passing through the first port 108 may be associated with the second asset 104, due to the association between the first port 108 and the second asset 104. Similarly, data traffic passing through the second port(s) 110 may be associated with the third asset 106, due to the association between the third asset 106 and the second port(s) 110.

In various examples, an application manager 130 be used to identify ports associated with various applications running on a host. For example, the analytics engine 124 may identify that the first port 108 is associated with the second asset 104 and that the second port(s) 110 are associated with the third asset 206, based on the application manager 130.

The application manager 130 may maintain data indicating the mapping of various applications, ports, and hosts within the network environment 100. For example, the application manager 130 may determine and/or store indications that the second asset 104 utilizes the first port 108, that the third asset 106 utilizes the second port(s) 110, that the second asset 104 and the third asset 106, or a combination thereof. In some cases, the application manager 130 is a component of the first asset 102 (e.g., an application hosted on the first asset 102). In some examples, the application manager 130 is located outside of the first asset 102. For instance, the application manager 130 may include software operating on at least one hardware device (e.g., one or more servers) connected to the communication network(s) 120. In some cases, the application manager 130 can include an agent configured to generate telemetry information that identifies the ports associated with the various applications running on a host.

In various cases, the application manager 130 can be implemented centrally or in a distributed fashion. In a centralized approach, the application manager 130 may include a network monitoring system and may derive relationships between applications running on a host based on five tuple relationships associated with the various applications and hosts within the network environment 100. In some cases, the application manager 130 may derive application context from application and process inventories associated with individual hosts in the network environment 100. In some cases, the application manager 130 may include an identity management system that maintains host-user associations. In a distributed approach, the application manager 130 can include agents hosted by various hosts throughout the network environment. The agents may have access to the network behavior, user context, and application context of the hosts in which they occupy.

In some cases, the network data communicated to the analytics engine 124 may be network data indicating data traffic exchanged by the first asset 102. As used herein, the term "exchanged" can refer to transmitted to, received from, or a combination thereof. The network data may indicate any source ports and/or destination ports of the data traffic. To determine the subset of the network data that is associated with the second asset 104, the analytics engine 124 may communicate with the application manager 130. For example, the analytics engine 124 may transmit a query to the application manager 130 about the first asset 102 and/or the second asset 104, and the application manager 130 may return a message indicating that the first port 108 is associated with the second asset. Accordingly, the analytics engine 124 may extract at least a portion of the network data associated with the second asset 104, and may ignore another portion of the network data associated with other applications running on the first asset 102 (e.g., the third asset 106). The analytics engine 124 may therefore calculate a particularized security metric for the second asset 104.

According to some implementations, the analytics engine 124 may determine a security metric of a particular port. For example, the analytics engine 124 may identify network data associated solely with the first port 108, rather than the second port(s) 110. Thus, in addition to applications and ports, individual ports can be analyzed based on security metrics.

In some cases, the analytics engine 124 may determine a security metric based on egress traffic of one of the assets 102, 104, or 106 or based on ingress traffic of one of the assets 102, 104, or 106. For instance, the analytics engine 124 may determine the number of the remote hosts 116 and/or the users 128 that have transmitted data traffic to the third asset 106, and identify an ingress security metric based on the number of the remote hosts 116 and/or the users 128. In some examples, the analytics engine 124 may determine the number of the remote hosts 116 and/or the users to which the third asset 106 has transmitted data traffic and may determine an egress security metric based on the number of the remote hosts 116 and/or the users 128.

The analytics engine 124 can calculate the security metric of an asset 102, 104, or 106 in accordance with temporal factors. For example, when calculating the security metric of the second asset 104, network data indicating recent data traffic (e.g., within the past day) may be more significant to the calculation of the security metric than network data indicating relatively old data traffic (e.g., over a week ago). In some cases, the analytics engine 124 may weigh the contribution of network data on the security metric based on the time of the data traffic indicated by the network data. For example, the weight of network data on the security metric may have a decaying relationship as the time since the data traffic used to generate the network data increases. The security metric of the second asset 104 may be calculated in accordance with temporal changes in data traffic exchanged by the second asset 104. Thus, a security metric of an asset may be calculated in accordance with any temporal decay in data traffic trends.

According to some instances, the analytics engine 124 can calculate the security metric of an asset 102, 104, or 106 based on an amount of data traffic exchanged by the asset 102, 104, or 106. For example, the security metric of the first asset 102 can be calculated based on an amount of data traffic (e.g., a number of bytes transferred, a number of packets transferred, a consistency of packets transferred, or the like) to and from the first asset 102. In some cases, the amount of data traffic is proportional to the security metric of the asset.

In some examples, the analytics engine 124 can calculate the security metric of an asset 102, 104, or 106 based on a type of data traffic associated with the asset 102, 104, or 106. In various instances, Transmission Control Protocol (TCP) data traffic to and from an asset 102, 104, or 106 can significantly impact an exposure of the asset 102, 104, or 106. In some cases, this significance is due to the ubiquity of three-way TCP handshakes. According to some examples, TCP data traffic is more significant to the criticality of an asset 102, 104, or 106 than other types of data traffic, such as User Datagram Protocol (UDP) data traffic. In various implementations described herein, the analytics engine 124 can calculate the security metric of an asset 102, 104, or 106 based on TCP data traffic associated with the asset 102, 104, or 106. The security metric may be independent of other types of data traffic, such as UDP data traffic, associated with the asset 102, 104, or 106.

In various implementations, the analytics engine 124 may determine the security metric of an asset 102, 104, or 106 based on data traffic exchanged with the asset 102, 104, or 106, during a time interval. The time interval may end at a current time, such that the time interval immediately precedes the calculation of the security metric and/or the identification (e.g., receipt) of network data used to calculate the security metric. The time interval may be selected to be long enough to avoid the influence of temporary trends in data traffic (e.g., holidays, weekends, or the like, wherein data traffic may be temporarily reduced or otherwise altered) on the security metric. However, the time interval may be selected to be short enough to prevent the analytics engine 124 from calculating the security metric based on outdated information. In some cases, the time interval may be no less than 7 days and may be no greater than one month or 31 days. For instance, the time interval may be within 6 to 8 days. In some examples, the time interval may be no less than 1 day and no greater than 31 days.

According to some implementations, the analytics engine 124 may calculate a first security metric of one of the assets 102, 104, or 106, and may propagate the first security metric to a neighboring asset. The analytics engine 124 may identify neighboring assets within the network environment 100 and propagate security metrics between the neighboring asset. For example, if data traffic of a neighboring asset is routed through the first asset 102, then the security metric of the first asset 102 is correlated to the communal relevance of the neighboring asset to the network. Thus, the security metric of one asset can be calculated based on the security metric of another, neighboring asset in the environment 100. In some cases, the security metrics of any of the assets 102, 104, or 106 can be propagated to other asserts within a same or similar geographic location as the assets. For example, the network data of the first asset 102 and the network data of another asset may indicate that the first asset 102 and the other asset are both located in the same city block and/or within less than a threshold distance (e.g., one mile) of one another. In this example, the security metric of the first asset 102 may be used to calculate the security metric of the other asset, such that the security metric of the first asset 102 is propagated to the other asset in proximity to the first asset 102.

In various examples, the security metrics of any of the assets 102, 104, or 106 can be output to a user device 132. The user device 132 may output the security metrics to a user, such as a security analyst of an enterprise that manages the assets 102, 104, and 106. In various cases the analyst may prioritize the security of assets 104, 104, and 106 with greater security metrics. For example, if the analyst only has time to patch a single vulnerability for an application within the enterprise, and the second asset 104 has a greater security metric than the third asset 106, then the analyst may patch the vulnerability of the second asset 104 before patching the vulnerability of the third asset 106. Thus, the security metrics can be used to provide important information to users, who can effectively prioritize the security of multiple assets within an enterprise based on the security metrics. Although FIG. 1 only depicts three assets 102, 104, and 106, in some examples, a user may be responsible for managing the security of numerous (e.g., at least 1,000) individual assets in an enterprise (e.g., a business). By identifying the up-to-date security metrics of those numerous assets, the user may be able to effectively prioritize their time in addressing potential security risks for the most critical assets to the enterprise.

According to some implementations, the security metrics can be utilized to automatically address security postures of the assets 102, 104, and 106. A security manager 134 may be configured to modify security postures of the assets 102, 104, and 106. In various cases, the security manager 134 can be implemented in software, hardware, or a combination thereof. The analytics engine 124 may output the security metrics to the security manager 134. In some cases, the analytics engine 124 and the security manager 134 are implemented in the same device and/or set of devices. According to various examples, the security manager 134 may update the security postures of the assets 102, 104, and 106 based on the security metrics associated with the assets 102, 104, and 106.

For example, the security manager 134 may control the firewall 112. If the security manager 134 determines that the security metric of the first asset 102 is sufficiently high (e.g., is above a first threshold), then the security manager 134 may increase the stringency of the firewall 112. For example, the security manager 134 may control the firewall 112 to adjust a firewall rule to be less permissive and to block more types of traffic. Alternately, if the security manager 134 determines that the security metric of the first asset 102 is sufficiently low (e.g., is below a second threshold, which may be different than the first threshold), the security manager 134 may decrease the stringency of the firewall 112. For example, the security manager 134 may control the firewall 112 to control the firewall to be more permissive and to allow more types of traffic.

According to some examples, the security manager 132 may control the firewall 112 to selectively output alerts based on the security metrics of the assets 102, 104, and 106. For example, when a security metric of the second asset 104 is greater than a threshold, the security manager 132 may control the firewall 112 to output one or more alerts regarding data traffic associated with the second asset 104 that was blocked by the firewall 112. For example, the firewall 112 may determine that one or more data packets directed to the second 104 are noncompliant with a firewall rule of the firewall 112. If the security metric of the second asset 104 is greater than a first threshold, in addition to blocking the noncompliant packet(s), the firewall 112 may output an alert (e.g., to the user device 132) indicating the blocked packet(s). However, if the security metric of the second asset 104 is less than a second threshold, then the firewall 112 may refrain from outputting an alert indicating the blocked packet(s).

In various examples, the security manager 132 may modify asset groups associated with the firewall 112 based on the security metrics of the assets 102, 104, and 106. For instance, the security manager 132 may automatically select, based on security metrics, one or more assets for a group and apply a consistent policy of the firewall 112 to the asset(s) in the group. The asset(s) in the group may be stored in a list at the security manager 132 and/or the firewall 112. In some cases, the security manager 132 may automatically add any of the assets 102, 104, and 106 whose security metrics exceed a threshold to a particular group. Each asset within the particular group may be similarly monitored and protected by the firewall 112. In some cases, the firewall 112 may generate and report alerts for any noncompliant data traffic associated with each asset in the particular group, and may refrain from generating and reporting alerts for noncompliant data traffic associated with assets outside of the particular group. In some examples, the firewall 112 may apply a particular firewall rule to data traffic exchanged by assets within the group, and may refrain from applying the particular firewall rule to data traffic exchanged by assets outside of the group. Accordingly, the security metrics can be used to independently manage security policies of any of the assets 102, 104, and 106 that can significantly impact the environment 100.

In some cases, the security manager 134 may implement multi-factor authentication (MFA) for the assets 102, 104, and 106. According to some examples, the security manager 134 includes an authentication service and one of the assets 102, 104, or 106 provides an application service. When one of the remote hosts 116 transmits a request (e.g., a request to login to the application service) to the asset 102, 104, or 106, the asset 102, 104, or 106 transmits an authentication request to the authentication service at the security manager 134. In some cases, the request includes a first authentication factor (e.g., a correct username and password of an account) to access the application service. The authentication service, in turn, transmits an authentication request to an authentication device, which may be different than the remote host 116. The authentication device may be associated with the username and password in the original request provided by the remote host 116. To successfully access the application service, a user 128 of the remote host 116 and the authentication device may input a second authentication factor. For example, the authentication device may output a selectable user interface element (e.g., a button), and the user 128 can accept the push notification by selecting an icon output that the user 128 can accept. In some examples, the authentication device may output a code (e.g., a number or string) that the user of the authentication device may input into the remote host 116. Upon inputting the second authentication factor, an authentication response may propagate from the authentication device to the authentication service, or from the service to the authentication service, and then to the service hosted by the asset 102, 104, or 106. Upon receiving the authentication response, the asset 102, 104, or 106 may identify that the remote host 116 is authorized, and may proceed to exchange data with the remote host 116. Although this example includes two authentication factors, in some cases, the user 128 must input more than two authentication factors to be authenticated by the authentication service and access the asset 102, 104, or 106. In various cases, the MFA process can be performed repeatedly, such as periodically. For example, the asset 102, 104, or 106 require the user 128 and/or the remote host 116 to reauthenticate periodically.

In some examples, the security manager 134 may alter the reauthentication period for the asset 102, 104, or 106 based on the security metric of the asset 102, 104, or 106. For instance, upon identifying that the security metric of the third asset 106 is greater than a first threshold, the security manager 134 may apply a relatively short reauthentication period (e.g., 8 hours). On the other hand, if the security metric of the third asset 106 is lower than a second threshold (which may be different than the first threshold), the security manager 134 may apply a relatively long reauthentication period (e.g., 60 days). In some cases, the security manager 134 may implement MFA for the asset 102, 104, or 106 in response to identifying the security metric of the asset 102, 104, or 106 is greater than a third threshold (which may be different than the first threshold or the second threshold), and may refrain from implementing MFA for the asset 102, 104, or 106 in response to identifying that the security metric of the asset 102, 104, or 106 is lower than or equal to the third threshold.

In various implementations of the disclosure, a security metric of a host (e.g., the first asset 102), an application operating on the host (e.g., the second asset 104 or the third asset 106), or a port (e.g., the first port 108 or the second port(s) 110) can be identified based on real-time data traffic trends to the asset of interest. In some cases, the security metric can be identified with a relatively low computational cost, thereby making it feasible for real-time adjustment. The security metric, in some examples, can be combined with other metrics (e.g., vulnerability metrics). The security metric can be output to a user, which may enable the user to appropriately prioritize the security posture of the asset in an enterprise that may include numerous (e.g., greater than 1,000 assets). In some cases, the security metric can be used to automatically adjust the security posture of the asset in the enterprise.

Figure 2:
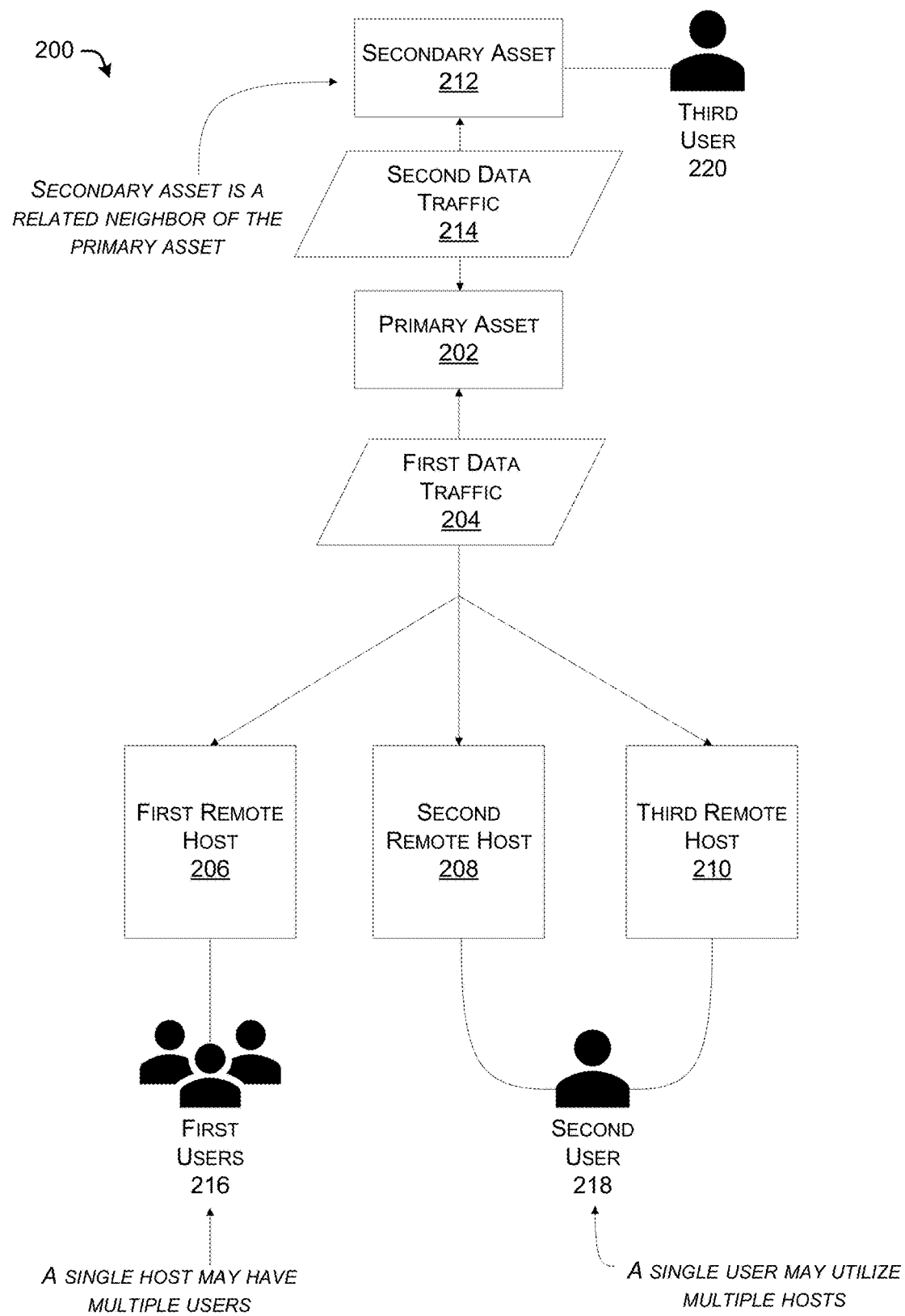
FIG. 2 illustrates an example of a network environment with various factors that impact a security metric of an asset.

FIG. 2 illustrates an example of a network environment 200 with various factors that impact a security metric of an asset. As illustrated, a primary asset 202 exchanges first data traffic 204 with a first remote host 206, a second remote host 208, and a third remote host 210. In addition, a secondary asset 212 may exchange second data traffic 214 with the primary asset 202. According to some implementations, the primary asset 202 and/or the secondary asset 212 can be or include the first asset 102, the second asset 104, the third asset 106, the first port 108, or any of the second port(s) 110 described above with respect to FIG. 1. In some cases, the first remote host 206, the second remote host 208, the third remote host 210, or any combination thereof, can be or include any of the remote hosts 116 described above with respect to FIG. 1.

In various examples, the primary asset 202 and the secondary asset 212 may be hosts, applications, ports, or any combination thereof. The first data traffic 204 and the second data traffic 214 may include egress data traffic of the primary asset 202, ingress data traffic of the primary asset 202, or any combination thereof. Although the first data traffic 204 and the second data traffic 214 are illustrated as bidirectional, in some implementations, the first data traffic 204 can exclusively include ingress data traffic or egress data traffic and/or the second data traffic 214 can exclusively include ingress data traffic or egress data traffic. As illustrated, the primary asset 202 is located between the secondary asset 212 and the first remote host 206, the second remote host 208, and the third remote host 210. Thus, data traffic exchanged between the secondary asset 212 and the first remote host 206, the second remote host 208, and the third remote host 210 is routed through the primary asset 202.

A first security metric of the primary asset 202 is calculated based on the first data traffic 204 and the second data traffic 214. For example, the first security metric is calculated based on the number of hosts that exchange the first data traffic 204 and the second data traffic 214 with the primary asset 202. Assuming the secondary asset 212 is a host, the number of hosts exchanging the first data traffic 204 and the second data traffic 214 with the primary asset 202 is four and includes the first remote host 206, the second remote host 208, and the third remote host 212. In contrast, a second security metric of the secondary asset 212 is calculated based on the number of hosts that exchange the second data traffic 214 with the secondary asset 212. Assuming the primary asset 202 is a host, the number of hosts exchanging the second data traffic 214 with the secondary asset 212 is one and includes the primary asset 202. Thus, by calculating the security metrics based on the numbers of accessing hosts, the first security metric of the primary asset 202 may be greater than the second security metric of the secondary asset 212.

In some cases, the first security metric of the primary asset 202 and the second security metric of the secondary asset 212 are calculated based on the number of users accessing the primary asset 202 and the secondary asset 212. The number of users accessing a given asset in the environment 200 may be different than the number of hosts accessing the asset in the environment 200. For example, the first remote host 206 may be associated with multiple first users 216. In addition, the second remote host 208 and the third remote host 210 may share a single second user 218. Further, the secondary asset 212 may be associated with a third user 220. The first security metric of the primary asset 202 may be calculated based on the number of users utilizing the primary asset 202. Assuming that the secondary asset 212 is a host and the first users 216 include three users, the first security metric may be calculated based on five users that include the first users 216, the second users 218, and the third user 220. However, the second security metric of the secondary asset 212 may be based on a single user, the third user 220. Thus, the first security metric of the primary asset 202 may be greater than the second security metric of the secondary asset 212.

However, calculating the secondary asset 212 based on network data of the second data traffic 214, alone, may not adequately represent the exposure of the secondary asset 212 to the network environment 200. For example, the exposure of the primary asset 202 to the first remote host 206, the second remote host 208, and the third remote host 210 is not reflected in the network data of the second data traffic 214. In the network data of the second data traffic 214, the primary host 202 may be represented as a single host with no users. In these examples, the network data of the second data traffic 214 does not account for the exposure of the secondary asset 212 to the first remote host 206, the second remote host 208, and the third remote host 210, even though the remote hosts 206, 208, and 210 significantly impact the exposure of the primary asset 202.

In various implementations described herein, security metrics can be propagated within the network environment 200. In some examples, security metrics can be propagated to nearest neighbors within the network environment 200. In the examples of FIG. 2, the primary asset 202 may be identified as a nearest neighbor of the secondary asset 212. As used herein, the term "nearest neighbor" can refer to adjacent nodes within a network. For example, nearest neighbors may be directly connected without any intermediary nodes being disposed between the nearest neighbors. In some cases, nearest neighbors can be defined as graph neighbors within a network.

According to various implementations, nearest neighbors in a network can be identified using a variety of techniques. For example, a network monitoring system may be accessed or otherwise utilized in order to identify five-tuple relationships, and the five-tuple relationships can be used to derive the nearest neighbors. In some cases, an identity management system can be used to identify host-user associations, and the nearest neighbors can be identified based on the host-user associations. Nearest neighbors can be derived based on directory systems, CMDBs, and the like.

In some examples, security metrics can be propagated between assets that are located in proximity to each other. For example, the primary asset 202 may be identified as proximal to the secondary asset 212. In some cases, the location of the primary asset 202 can be identified based on network data associated with the primary asset 202 and the location of the secondary asset 212 can be identified based on network data associated with the secondary asset 212. According to various implementations, the security metric of the primary asset 202 can be propagated to the security metric of the secondary asset 212 if the location of the primary asset 202 is within a threshold distance (e.g., 30 feet, 100 feet, one mile, or the like) of the secondary asset 212. In some cases, the primary asset 202 and the secondary asset 212 can be determined to be proximal based on comparisons of their respective locations to a map. For example, the primary asset 202 and the secondary asset 212 can be determined to be proximal to each other if the primary asset 202 and the secondary asset 212 are located at the same address, on the same city block, in the same building, on the same floor of the same building, or any combination thereof. Assets that are located within proximity of each other can be referred to as "proximal neighbors."

In some instances, the second security metric of the secondary asset 212 is calculated and/or adjusted based on the primary security metric of its nearest neighbor and/or proximal neighbor, which in these cases, is the primary asset 202. A revised second security metric can be calculated by adding the second security metric and a propagation factor that is based on the first security metric of the primary asset 202. For example, a revised security metric of an asset can be calculated using the following Equation 2:

$$S_r = S + \Sigma_1^n f_{prop}(n) \qquad \text{Eq. 2}$$

Wherein $S_r$ is a revised security metric of an asset, S is an (unrevised) security metric of the asset, n is 0 or a positive integer and represents the number of nearest neighbors and/or proximal neighbors of the asset, and $f_{prop}(n)$ is a propagation factor contributed by the nth nearest neighbor and/or proximal neighbor of the asset. For example, the propagation factor associated with one nearest neighbor may be based on a fixed percentage (e.g., 1%, 5%, 10%, 50%, 90%, or the like) of the security metric associated with the nearest neighbor and/or proximal neighbor.

According to various implementations, a revised security metric can be calculated using the following Equation 3:

$$S_r = \max(S_0, S_n) \qquad \text{Eq. 3}$$

wherein $S_r$ is a revised security metric of an asset, $S_0$ is a first security metric of an asset without propagation, $S_n$ is a new security metric computed by considering exponential decay and proportional distribution of first security metrics of its nearest neighbors and/or proximal neighbors. For instance, the revised security metric of an asset may be based on the security metrics of a first proximal neighbor and a second proximal neighbor of the asset. The weights of the security metrics of the first proximal neighbor and the second proximal neighbor can be inversely proportional to the respective distances between the asset and the first proximal neighbor and the second proximal neighbor. For example, if the first proximal neighbor is located closer to the asset than the second proximal neighbor, than the security metric of the first proximal neighbor is weighted higher than the security metric of the second proximal neighbor in the calculation of the security metric of the asset.

The security metric of each nearest neighbor and/or proximal neighbor may be defined in a variety of ways. For example, the security metric of a nearest neighbor and/or proximal neighbor may be calculated in accordance with temporal factors corresponding to temporal changes in data traffic to the nearest neighbor and/or proximal neighbor. For instance, network data associated with recent data traffic (e.g., within the past day) of a nearest neighbor may have a greater impact on the security metric of an asset than network data associated with older data traffic (e.g., older than a week) of the nearest neighbor. Thus, a security metric of an asset may be calculated in accordance with any temporal changes in data traffic trends associated with the asset's nearest neighbors and/or proximal neighbors.

For example, a security metric of an asset can be calculated using the following Equation 4:

$$S = \Sigma_1^m w(t) c_{inter}(m) \qquad \text{Eq. 4}$$

wherein S is a security metric of an asset, m represents the number of discrete time intervals corresponding to network traffic that is relevant to the security metric, t is the time since the time interval, w(t) is a weight as a function of the time since the time interval, and $c_{inter}(m)$ is the contribution of the network data to the security metric in time interval m. In some examples, w(t) can be an exponential decay function, such that as t increases, w(t) decreases. $C_{inter}(m)$ can be, for instance, the number of hosts that have accessed the asset during time interval m, the number of users that have accessed the asset during time interval m, the number of locations of hosts that have accessed the asset during time interval m, or the like. Thus, the security metric can reflect temporal changes in data traffic trends over time.

In some cases, the security metric of the nearest neighbor and/or proximal neighbor can be calculated based on bytes transferred to the nearest neighbor and/or proximal neighbor, packets transferred to the nearest neighbor and/or proximal neighbor, a consistency of flows to the nearest neighbor and/or proximal neighbor, or the like. According to some examples, the security metric of the nearest neighbor and/or proximal neighbor may be an ingress security metric or an egress security metric, and may be selected based on a direction of data traffic between the nearest neighbor and/or proximal neighbor and the asset. In some cases, the security metric of the nearest neighbor and/or proximal neighbor may be based on a specific protocol of data traffic exchanged with the nearest neighbor and/or proximal neighbor and remote hosts. For example, the security metric of the nearest neighbor and/or proximal neighbor can be calculated based on TCP data traffic, without considering UDP traffic, due to the stronger nature of relationships between hosts exchanging TCP data traffic due to the three-way TCP handshake.

Referring back to FIG. 2, the second security metric of the secondary asset 212 can be revised based on the first security metric of the primary asset 202. For example, the revised second security metric may be equal to a sum of the second security metric and a propagation factor that is based on the first security metric. As a result, the revised second security metric may be greater than the second security metric, thereby accounting for the more significant exposure of the primary assets 202 to other hosts within the network environment 200.

In various implementations of the present disclosure, propagation of security metrics throughout assets in a network can address the differences in exposure of neighbors of an asset, even when that asset only exchanges data traffic directly with its neighbors. Thus, propagation can be used to more accurately prioritize assets within a network based on their relevance and exposure to hosts and/or users.

FIG. 3 illustrates an example table 300 that utilizes shortened addresses for calculating a security metric of an asset. In some cases, the table 300 can represent network data for the asset. The asset can include or be, for instance, the first asset 102, the second asset 104, the third asset 106, the first port 108, any of the second port(s) 110, or any combination thereof.

The table 300 includes four rows including four entries that correspond to four different flows. The four flows involve the asset during a particular time interval. For example, the four flows may represent egress data traffic of the asset, ingress data traffic of the asset, or a combination thereof.

The table 300 includes five columns which respectively represent five types of information about the flows. An asset address 302 field represents the address (e.g., an IP address) of the asset involved in the four flows. An asset port 304 field represents the ports of the asset that are involved in the four flows. A remote host address 306 field represents the addresses (e.g., IP addresses) of the remote hosts involved in the four flows. A binary address 308 field represents the binary form of the remote host addresses. A shortened address 310 field represents a shortened binary form of the remote host addresses.

As illustrated in FIG. 3, the asset may have an address of "9.9.9.9." The first and second flows may utilize asset port "443" and the third and fourth flows may utilize asset port "80." Four individual remote hosts are respectively associated with the four flows. For instance, the first flow involves a remote host with an address of "1.1.1.1," the second flow involves a remote host with an address of "1.1.1.2," the third flow involves a remote host with an address of "2.2.2.1," and the fourth flow involves a remote host with an address of "2.2.2.2." In the table 300 illustrated in FIG. 3, each address is represented by four numbers. In an example in which the addresses are IPv4 addresses, each number in each address ranges from 0 to 255. The address space for IPv4 addresses includes 4,294,967,296 possible addresses.

In some examples, a security metric of the asset may be calculated based on all four flows represented in the table 300. For instance, the security metric may be equal to the total number of unique addresses of hosts exchanging data traffic with the asset, divided by the total address space. Because table 300 lists four unique addresses in the remote host address 208 field, the security metric based on the remote host addresses can be equal to 4 over 4,294,967,296. A security metric for port 443 may be equal to 2 over 4,294,967,296. Similarly, a security metric for port 80 may be equal to 2 over 4,294,967,296.

While this form of the security metric can accurately represent the exposure of the asset to remote hosts within the network, the amount of computing resources that can be used to calculate the security metric may be unnecessarily high. Further, when more complex addresses (e.g., IPv6 addresses with an address space of approximately $3.403*10^{38}$) are used, the amount of computing resources to calculate the security metric may be exorbitantly high. In environments with limited computing resources, it may be difficult to impossible to perform these computations for each of numerous assets in an enterprise and/or difficult to impossible to perform these computations in real-time.

In various implementations of the present disclosure, the security metric can be calculated using shortened forms of the addresses of the remote host, thereby significantly saving computing resources. In some cases, the shortened forms of the remote host addresses may be based on the binary forms of the remote host addresses. The binary address 208 field lists the binary forms of the remote host addresses. As shown, these binary addresses each include 32 digits, which can be referred to as "bits." A first subset of bits in an example binary address, which may be the leftmost digits in the address, can be defined as the most significant bits in the address. The remaining subset of bits in the example binary address, which may be the rightmost digits in the address, can be defined as the least significant bits in the address.

The shortened address 312 field lists the most significant bits in the corresponding binary addresses. For example, the shortened address 312 field may list the 24 first digits of the corresponding binary addresses in the binary address 310 field. In some cases, a shortened address may be referred to as a "network prefix." In various examples, the security metric of the asset can be estimated or calculated based on the shortened addresses. The shortened address 312 field lists two unique shortened addresses. The shortened addresses in the table 300 of FIG. 3 have an address space of 16,777,216, which is significantly lower than the address space of the remote host addresses. Thus, in some examples, the security metric of the asset can be equal to 2 over 16,777,216. The security metric of port 443 can be equal to 1 over 16,777,216. Similarly, the security metric of port 80 can be equal to 1 over 16,777,216. The security metrics calculated using the most significant digits of the binary addresses can accurately represent the exposure of the assets and/or ports to remote hosts, but can be calculated using significantly fewer computing resources than the security metrics calculated using the entire remote host addresses.

Figure 4:
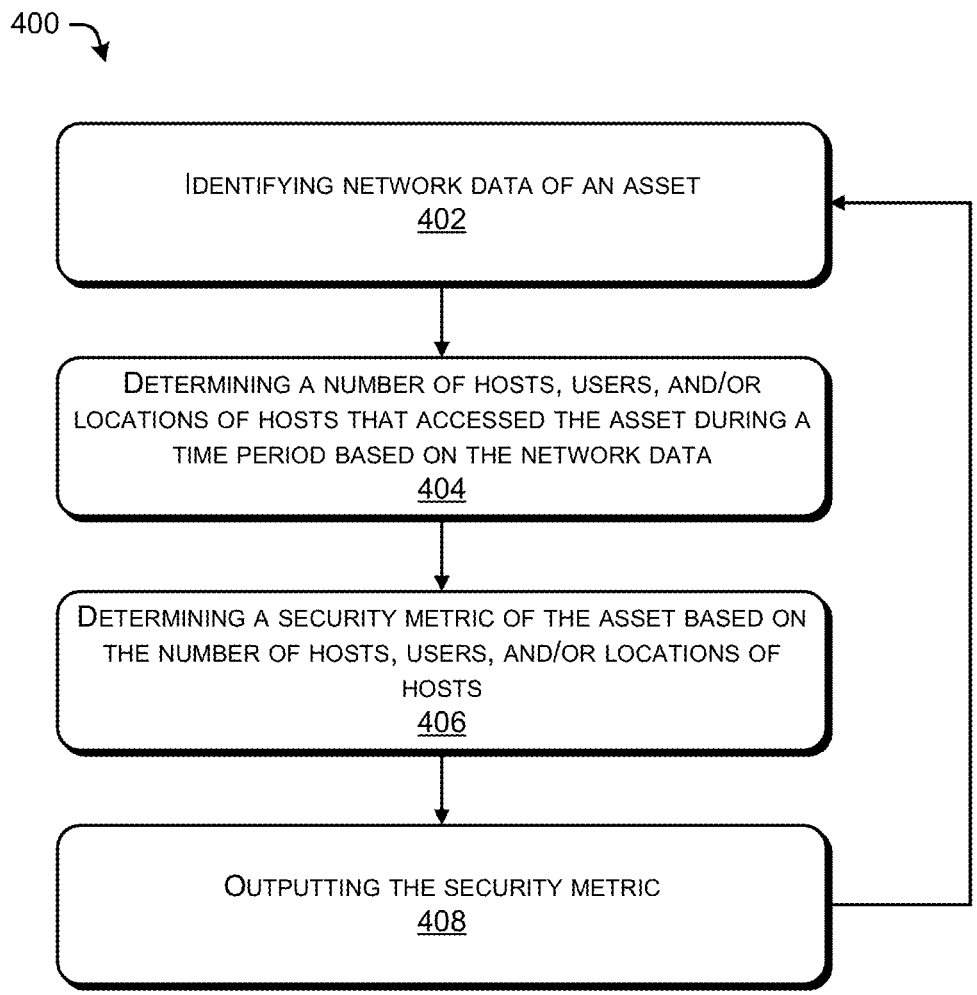
FIG. 4 illustrates an example process for calculating a security metric of an asset.

FIG. 4 illustrates an example process 400 for calculating a security metric of an asset. In various implementations, the process 400 can be performed by an entity that includes the asset (e.g., the first asset 102, the second asset 104, or the third asset 106 described above with respect to FIG. 1), a host (e.g., the first asset 102 or any one of the remote hosts 116 described above with respect to FIG. 1), an application (e.g., the second asset 104 or the third asset 106 described above with respect to FIG. 1), an exporter (e.g., the exporter 114 described above with respect to FIG. 1), a collector (e.g., the collector 118 described above with respect to FIG. 1), an analytics engine (e.g., the analytics engine 124 described above with respect to FIG. 1), an identity manager (e.g., the identity manager 126 described above with respect to FIG. 1), an application manager (e.g., the application manager 130 described above with respect to FIG. 1), a user device (e.g., the user device 132 described above with respect to FIG. 1), a security manager (e.g., the security manager 134 described above with respect to FIG. 1), or any combination thereof.

At 402, the entity performing the process 400 can identify network data of an asset. In various examples, the asset may be a host, an application, a port, or any combination thereof. The network data may identify one or more data flows associated with the asset. For example, the network data may identify at least one ingress data flow addressed to the asset, at least one egress data flow output by the asset, or a combination thereof. According to some examples, the network data indicates the source and/or destination of each data flow. The asset may be a source or a destination of each flow. In some cases, the network data indicates addresses (e.g., IP addresses) of the source and destination of each flow. In some instances, the network data identifies a source port (e.g., a port number of the source) and a destination port (e.g., a port number of the destination) of each flow. According to some examples, the network data indicates an amount of data (e.g., in bytes) transferred in each data flow. Further, in some cases, the network data indicates times of the various data flows associated with the asset. According to various implementations, the network data can be generated, received, or otherwise identified using NetFlow.

At 404, the entity may determine a number of hosts, users, and/or locations of hosts that accessed the asset during a time period based on the network data. In some cases, the time period is greater than or equal to 7 days, which may account for temporary changes in data traffic trends throughout a week. For instance, the asset may temporarily have lower data traffic during weekends or holidays. In some instances, the time period is greater than or equal to 1 day and less than or equal to 31 days or a month. The limit on the length of the time period may prevent consideration of outdated data traffic that is irrelevant to the immediate criticality of the asset.

In some examples, the number of hosts that received data from and/or transmitted data to the asset can be derived from the network data. For instance, the number of unique addresses of hosts accessing the asset can be identified and used to estimate the number of hosts accessing the asset during the time period. In some cases, the addresses can be shortened and the number of shortened addresses can be used to estimate the number of hosts accessing the asset during the time period. For instance, the shortened addresses can be generated by extracting a subset of the most significant digits of the addresses. In some cases, the addresses represent binary forms of IP addresses of the hosts, and the shortened addresses can be the first or leftmost digits of the binary forms of the IP addresses, wherein the shortened addresses are shorter than the original addresses.

In some cases, the number of users associated with hosts that received data from and/or transmitted data to the asset can be derived, at least in part, based on the network data. For example, the unique addresses of hosts accessing the asset can be identified. The number of users associated with each of the hosts can be identified based on the addresses of the hosts. For instance, user-host mappings generated by pxGrid can be used to identify the number of users based on the addresses of the hosts.

In some examples, 404 can include determining the number of locations of the hosts that have accessed the asset during the time period. The locations of individual hosts that have received data and/or transmitted data can be based on the addresses of the hosts. Host-location mappings can be generated, for example, using nvzFlow or some comparable technology. In some cases, the number of unique locations are derived based on a latitude, longitude, and/or an altitude of each host accessing the asset. In some cases, the locations can be compared to a map indicating streets, buildings, and the like, to determine whether any of the locations are sufficiently close to one another. Locations that are sufficiently close to one another (e.g., within the same city block, the same corporate campus, within a threshold distance of each other) may be deemed the same location for the purposes of this analysis.

At 406, the entity may determine a security metric of the asset based on the number of hosts, users, and/or locations of hosts. In some cases, the security metric may be proportional to the number of hosts, the number of users, and/or the number of locations of hosts. Thus, the security metric may correspond to the communal relevance of the asset to hosts within a network and/or users of hosts within a network. For instance, a relatively high security metric may indicate that the asset is relatively important to and interconnected with hosts and/or users, and may therefore be prioritized among a group of assets managed by a security analyst or enterprise.

In some cases, the security metric is normalized. The security metric may be based on the number of hosts and/or users divided by a space of possible hosts and/or users in the network. For instance, the security metric may be based on the number of shortened addresses associated with hosts that have exchanged data traffic with the asset during the time period divided by the total number of possible addresses in the address space of the shortened addresses. In some cases, the security metric is a number between 0 and 1. Thus, the security metric of the asset can be efficiently compared to other security metrics of other assets within the network.

According to some examples, the security metric is further determined based on other factors. For instance, the security metric can be further determined based on one or more security metrics of one or more nearest neighbors and/or proximal neighbors of the asset within the network. Thus, the security metric of a nearest neighbor and/or proximal neighbor is propagated onto the security metric of the asset. In some cases, the security metric is further based on an amount of data transmitted between the asset and the hosts. For example, the security metric can be proportional to the amount of data transmitted between the asset and the hosts during the time period, which may be reflected in the network data.

In some example, the time period can be broken down into multiple sub-time periods. The number of hosts, users, and/or locations of hosts in each discrete sub-time period can be identified. The number of hosts, users, and/or locations of hosts in respective sub-time periods can be weighted differently with respect to the security metric. For example, the number of hosts, users, and/or locations of hosts that accessed the asset in a first sub-time period representing one day that occurred a week ago can minimally impact the security metric of the asset, whereas the number of hosts, users, and/or locations of hosts that accessed the asset in a second sub-time period representing the past day can significantly impact the security metric of the asset. The weight associated with the number of hosts, users, and/or locations of hosts of each respective sub-time period can have an exponential decay relationship with respect to the time elapsed since the sub-time period occurred.

At 408, the entity may output the security metric. In some cases, the entity may cause a user device to output the security metric to a user, such as a security analyst. Thus, the user may use the security metric to make determinations about how to prioritize security management of the asset among multiple assets within the network.

In some examples, the entity may output the security metric to a security manager, which may automatically adjust a security policy of the asset based on the security metric. For instance, the entity and/or the security manager may cause a firewall protecting the asset to output an alert indicating one or more data packets that are blocked by the firewall when the security metric is greater than a first threshold. The alert may be transmitted to and/or output by a user device of the security analyst. In some cases, the entity and/or the security manager may cause the firewall to refrain from outputting the alert if the security metric is lower than a second threshold.

In some cases, the entity and/or the security manager may alter an authentication interval of the asset based on the security metric. The authentication interval may be, for instance, an interval at which the asset trusts an authentication of a user before requiring the user to reauthenticate. The asset and/or an authentication service associated with the asset may require MFA of the user before allowing a device of the user to access the asset. According to some examples, the entity and/or the security manager may decrease an authentication interval of the asset if the security metric is above a first threshold. On the other hand, the entity and/or the security manager may increase an authentication interval of the asset if the security metric is below a second threshold.

In some examples, the security metric can be combined with another metric, and the combined metric can be output at 408. In some examples, the security metric can be combined with other metrics in order to assess a security risk of the asset. For instance, a vulnerability exploit probability of the asset can be calculated by combining (e.g., multiplying) a security metric representing the criticality of the asset (e.g., generated based on the total number of hosts, the total number of locations, or the total number of users accessing the asset) with a score indicating the asset's exploitation risk (e.g., a CVSS score of the asset). The exploitation risk can be calculated based on a vulnerability risk of the asset, a compliance risk of the asset, a malware risk of the asset, a denial of service (DOS) risk of the asset, or any combination thereof. Further, a vulnerability risk of the asset can be calculated by combining (e.g., multiplying) a security metric representing the exposure of the asset (e.g., generated based on shortened addresses of the hosts or locations of the hosts accessing the asset) with the vulnerability exploit probability. In various cases, the vulnerability exploit probability and/or the exploitation risk can be output by a user device and/or used to adjust a security policy of the asset. In some cases, the security metric output at 408 may include the vulnerability exploit probability.

As illustrated in FIG. 4, the process 400 may return back to 402 after the security metric is output at 408. That is, the process 400 can be performed periodically and/or continuously as the network data changes over time. In some cases, the process 400 can be repeated at a frequency of once every second, once every minute, once every hour, once every day, or some other frequency. According to some examples, the process 400 can be repeated in response to the asset receiving or transmitting additional data traffic. Thus, the security metric can be substantially up-to-date with network conditions of the asset.

Although the process 400 is described with respect to a single asset, in some cases, multiple assets can be monitored by the entity using the process 400. For example, at least ten assets, at least 100 assets, at least 1,000 assets, at least 10,000 assets, or some other number of assets, can be simultaneously monitored using the process 400. Because the process 400 may utilize a relatively low amount of computing resources, the security metrics of numerous assets can be efficiently calculated and adjusted by the entity in accordance with real-time network conditions.

Figure 5:
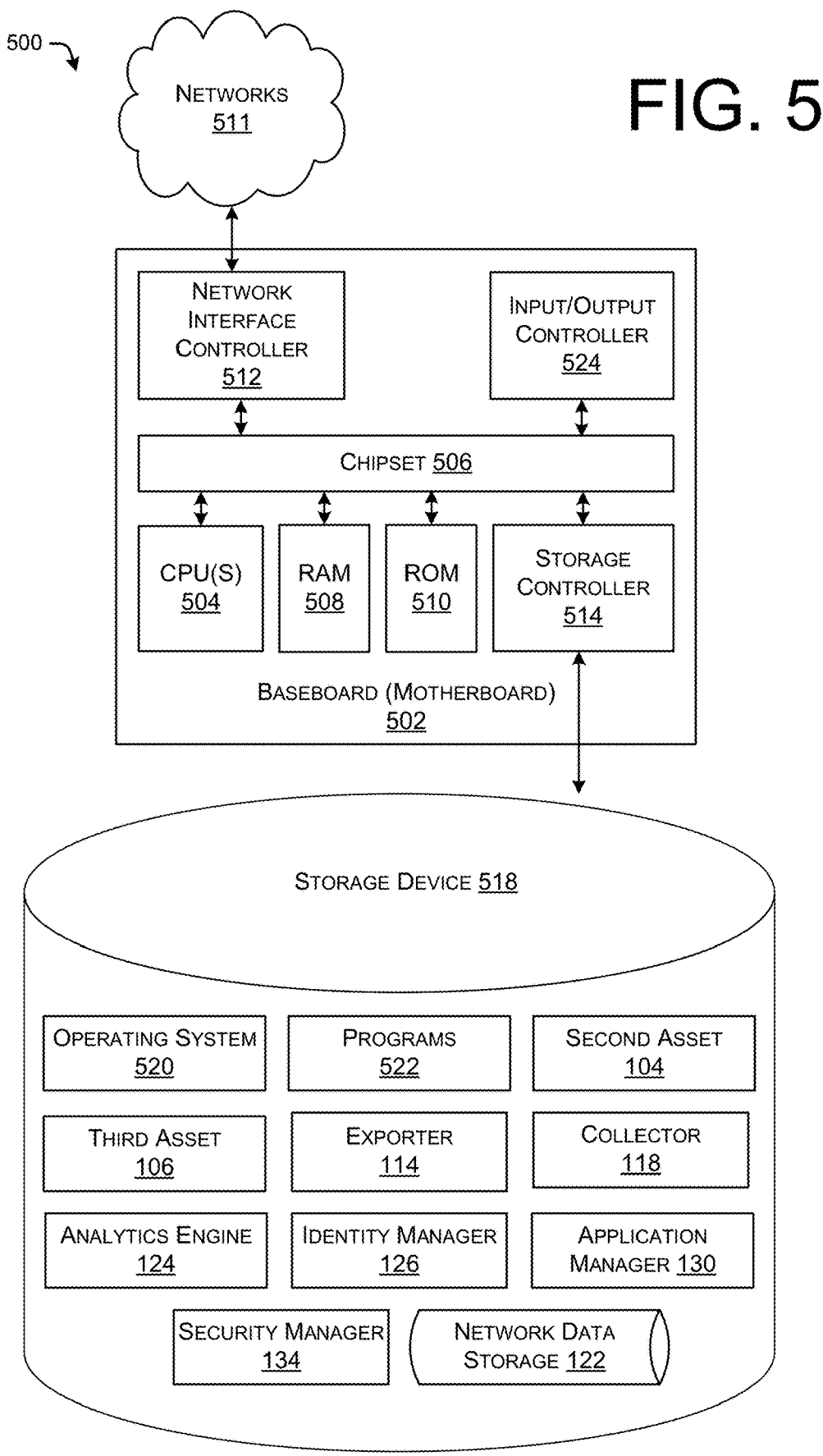
FIG. 5 shows an example computer architecture for a server computer capable of executing program components for implementing the functionality described herein.

FIG. 5 shows an example computer architecture for a server computer 500 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein. The server computer 500 may, in some examples, correspond to any network node described herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a random-access memory (RAM) 508, used as the main memory in the computer 500. The chipset 506 can further provide an interface to a computer-readable storage medium such as a read-only memory (ROM) 510 or non-volatile RAM (NVRAM) for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 511. The chipset 506 can include functionality for providing network connectivity through a network interface controller (NIC) 514, such as a gigabit Ethernet adapter. The NIC 514 is capable of connecting the computer 500 to other computing devices over the network 511. It should be appreciated that multiple NICs 514 can be present in the computer 500, connecting the computer 500 to other types of networks and remote computer systems. In some instances, the NICs 514 may include at least on ingress port and/or at least one egress port.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 516 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by any network node described herein may be supported by one or more devices similar to computer 500. Stated otherwise, some or all of the operations performed by a network node may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system 520 comprises the LINUX™ operating system. According to another embodiment, the operating system includes the WINDOWS™ SERVER operating system from MICROSOFT Corporation of Redmond, Wash. According to further embodiments, the operating system can comprise the UNIX™ operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

As illustrated in FIG. 5, the storage device 518 stores programs 522, which may include one or more processes, as well as any of the second asset 104, the third asset 106, the exporter 114, the collector 118, the analytics engine 124, the identity manager 126, the application manager 130, the security manager 134, and the network data storage 122. In some cases, any one of the second asset 104, the third asset 106, the exporter 114, the collector 118, the analytics engine 124, the identity manager 126, the application manager 130, the security manager 134, and the network data storage 122 can be omitted from the computer 500. The process(es) may include instructions that, when executed by the CPU(s) 504, cause the computer 500 and/or the CPU(s) 504 to perform one or more operations.

The computer 500 can also include one or more input/output controllers 528 for receiving and processing input from a number of input devices, such as a keyboard, a mouse, a touchpad, a touch screen, an electronic stylus, or other type of input device. Similarly, an input/output controller 528 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:

exchanging, by a first asset, first data traffic during a time period;

determining a number of hosts that exchanged the first data traffic with the first asset during the time period;

determining a first security metric of the first asset based on the number of the hosts, the first security metric indicating a vulnerability to attack associated with the first asset;

determining a second security metric of a second asset comprising a nearest neighbor of the first asset, the nearest neighbor of the first asset being directly connected to the first asset in a network, and the second security metric indicating a vulnerability to attack associated with the second asset;

determining a third security metric indicating the vulnerability to attack associated with the first asset based on the first security metric and the second security metric, and based on the second security metric comprising a nearest neighbor of the first asset;

adjusting a security policy of the first asset based on the third security metric; and exchanging, by the first asset, second data traffic based at least in part on the security policy.

2. The method of claim 1, wherein determining the number of the hosts that exchanged the first data traffic with the first asset comprises:
- identifying, based on network data, addresses of the hosts;
- generating shortened addresses by extracting a subset of most significant digits of the addresses, the shortened addresses being shorter than the addresses; and
- determining the number of the hosts based on a number of the shortened addresses.

3. The method of claim 1, wherein the time period is greater than or equal to 7 days and less than or equal to 31 days.

4. The method of claim 1, the hosts being first hosts, wherein the first asset comprises at least one of an application, a port, or a second host.

5. The method of claim 1, wherein the nearest neighbor comprises a graph neighbor of the first asset.

6. The method of claim 1, wherein determining the third security metric of the first asset comprises adding the first security metric and a product of the second security metric and a propagation factor associated with the second asset.

7. The method of claim 1, wherein the nearest neighbor of the first asset is connected to the first asset without any intermediary nodes being disposed between the nearest neighbor of the first asset and the first asset in the network.

8. The method of claim 1, wherein determining the second security metric of the second asset comprising the nearest neighbor of the first asset comprises determining the second security metric based on data traffic transmitted between the nearest neighbor of the first asset and the first asset.

9. The method of claim 1, wherein the third security metric is a function of an exposure associated with the first asset and an exploitation risk associated with the first asset.

10. A system, comprising:
- at least one processor; and
- one or more non-transitory media storing instructions that, when executed by the system, cause the system to perform operations comprising:
  - determining a number of hosts that exchanged first data traffic with a first asset;
  - determining a first security metric of the first asset based on the number of the hosts, the first security metric indicating a vulnerability to attack associated with the first asset;
  - determining a second security metric of a second asset comprising a nearest neighbor of the first asset, the nearest neighbor of the first asset being directly connected to the first asset in a network, and the second security metric indicating a vulnerability to attack assoicated with the second asset;
  - determining a third security metric indicating the vulnerability to attack associated with the first asset based on the first security metric and the second security metric, and further based on the second security metric comprising a nearest neighbor of the first asset;
  - causing an external entity configured to adjust a security policy of the first asset based on the third security metric; and
  - causing the first asset to exchange second data traffic based at least in part on the security policy.

11. The system of claim 10, wherein determining the number of the hosts that exchanged the first data traffic with the first asset comprises:
- identifying addresses of the hosts;
- generating shortened addresses by extracting a subset of most significant digits of the addresses, the shortened addresses being shorter than the addresses; and
- determining the number of the hosts based on a number of the shortened addresses.

12. The system of claim 10, wherein the nearest neighbor comprises a graph neighbor of the first asset.

13. The system of claim 10, wherein determining the third security metric of the first asset comprises adding the first security metric and a product of the second security metric and a propagation factor associated with the second asset.

14. The system of claim 10, wherein the security policy comprises a multi-factor authentication (MFA) interval or a firewall policy of the first asset.

15. The system of claim 10, wherein:
- the operations further comprise determining a number of locations of the hosts, and
- determining the first security metric of the first asset is further based on the number of locations.

16. The system of claim 10, wherein:
- the operations further comprise determining a number of users of the hosts, and
- determining the first security metric of the first asset is further based on the number of users.

17. A system, comprising:
- at least one processor; and
- one or more non-transitory media storing instructions that, when executed by the system, cause the system to perform operations comprising:
  - determining a number of hosts that exchanged first data traffic with a first asset;
  - generating a first security metric of the first asset based on the number of the hosts;
  - determining second security metrics of n second assets, the n second assets respectively comprising nearest neighbors of the first asset, n being a positive integer;
  - determining propagation factors of the n second assets based on the second security metrics;
  - determining a third security metric of the first asset based on a following equation:

$$S + \Sigma_1^n f_{prop}(n),$$

wherein S is the first security metric and $f_{prop}(n)$ is a propagation factor contributed by an nth second asset;
  - causing an external entity configured to adjust a security policy of the first asset based on the third security metric; and
  - causing the first asset to exchange second data traffic based at least in part on the security policy.

18. The system of claim 17, wherein determining the number of the hosts that exchanged first data traffic with the first asset comprises:
- identifying Internet Protocol (IP) addresses of the hosts;
- generating binary addresses by converting the IP addresses to a binary form;
- generating shortened addresses that are a predetermined number of leftmost digits of the binary addresses; and
- determining the number of the hosts by determining a number of the shortened addresses.

19. The system of claim 17, wherein the nearest neighbors are directly adjacent to the first asset.

20. The system of claim 17, wherein:
- the operations further comprise:
  - determining a number of locations of the hosts; and
  - determining a number of users of the hosts, and generating the first security metric is further based on the number of locations and the number of users.

\* \* \* \* \*